US012696879B2

(12) United States Patent
Baker

(10) Patent No.: US 12,696,879 B2
(45) Date of Patent: Aug. 4, 2026

(54) FLOATING DOWEL BEE FEEDER

(71) Applicant: John Gregory Baker, Plano, TX (US)

(72) Inventor: John Gregory Baker, Plano, TX (US)

( * ) Notice: Subject to any disclaimer, the term of this patent is extended or adjusted under 35 U.S.C. 154(b) by 0 days.

(21) Appl. No.: 18/814,502

(22) Filed: Aug. 24, 2024

(65) Prior Publication Data

US 2026/0053119 A1     Feb. 26, 2026

(51) Int. Cl.
A01K 53/00          (2006.01)

(52) U.S. Cl.
CPC ..................................... A01K 53/00 (2013.01)

(58) Field of Classification Search
None
See application file for complete search history.

(56) References Cited

U.S. PATENT DOCUMENTS

| | | | | | |
|---|---|---|---|---|---|
| 14,168 | A | * | 1/1856 | Robertson | A01K 53/00 |
| 63,135 | A | * | 3/1867 | Beebe | A01K 53/00 |
| 10,485,225 | B1 | * | 11/2019 | Jester | A01K 53/00 |
| 2006/0154565 | A1 | * | 7/2006 | Mills | A01K 47/00 |
| | | | | | 449/4 |
| 2018/0084763 | A1 | * | 3/2018 | Solano | A01K 47/02 |

OTHER PUBLICATIONS

Jason Chrisman Bees, YouTube video: Simple Frame Feeder Float Design Saves Drowning Bees, https://www.youtube.com/watch?v=Xrtvst5XEvo , Sep. 21, 2016 (Year: 2016).*
Mumbai Balcony Gardener's Planted Aquariums, 2 Simple DIY Bee Feeders | How to Feed Starving Honey Bees | Bee Frenzy!!, https://www.youtube.com/watch?v=U8F5pkEiQwg (Year: 2017).*

* cited by examiner

*Primary Examiner* — Joshua J Michener
*Assistant Examiner* — Henry Hooper Mudd
(74) *Attorney, Agent, or Firm* — Baker Law Firm

(57)          ABSTRACT

A bee feeder designed to prevent bee drowning and minimize inter-hive fighting. The feeder comprises a long rectangular container, optimally 2 to 6 feet in length, with taller walls (4 to 10 inches) to contain a significant volume of bee syrup. Floating wooden dowels, approximately ¼ inch in diameter and slightly shorter than the width of the container, are placed side by side atop the syrup, creating a safe bee feeding surface. The dowels are light enough to float as bees land on them, enabling access to the syrup. High-sugar concentration syrup used in the feeder creates an osmotic preservation effect, protecting the dowels from decay. This invention provides an efficient and safe method for feeding large numbers of bees, with advantages over smaller or bucket-style feeders, particularly in terms of surface area and ease of use. It allows bees to feed without crowding and requires fewer refills.

24 Claims, 4 Drawing Sheets

FLOATING DOWEL BEE FEEDER

FIELD OF THE INVENTION

The present invention relates to beekeeping equipment, specifically to feeders designed to safely provide syrup to honeybees while preventing drowning and reducing aggressive behavior among bees.

BACKGROUND OF THE INVENTION

Current bee feeders on the market often struggle with issues such as bee drowning and inter-hive fighting due to overcrowded feeding areas. Traditional feeders usually comprise small containers or inverted 5-gallon buckets that feature limited feeding crevices on their surface areas, often leading to numerous bee drownings within these crevices. These designs not only lead to overcrowding at the feeding area, increasing the likelihood of inter-hive aggression, but also pose a significant risk of bees drowning, especially when they fall into the syrup while feeding.

Many beekeepers attempt to address these problems by using multiple small feeders, which increases the time and effort required for refilling and maintenance. The upside-down 5-gallon bucket design, while popular, provides only limited feeding crevices, resulting in inadequate surface area for bees to feed efficiently.

SUMMARY OF THE INVENTION

The present invention addresses these shortcomings by providing a larger feeding surface area with floating dowels that prevent bees from drowning and reduce inter-hive fighting. Certain objects, aspect and features ensure that bees can feed safely and comfortably, with ample space to spread out, thereby minimizing aggression and overcrowding. Additionally, the high sugar concentration in the syrup used creates an osmotic barrier that preserves and protects the wooden dowels from decay, further enhancing the longevity and effectiveness of the feeder. Beekeepers benefit from reduced maintenance, as the feeder's large capacity and efficient design minimize the need for frequent refills and allow for more bees to feed simultaneously, offering a more practical and reliable solution than smaller feeders or the accumulation of crevices in the upside-down bucket design.

Traditional bee feeders often require beekeepers to unscrew lids, open hive bodies, or disturb the bees, necessitating the use of protective clothing. These methods can be time-consuming, increase the risk of harming the bees, and expose beekeepers to potential stings. Additionally, in many existing feeders, bees may become submerged in the syrup, leading to bee drowning, which not only results in the loss of bees but also contaminates the feed.

Preferred Floating Dowel Bee Feeder Embodiment of the Invention

A preferred embodiment of the invention utilizes dowels with a diameter ranging from ¼ inch to ¾ inch. The increased mass of these larger dowels helps them to fit more snugly together when placed side by side, reducing movement on the surface of the syrup and providing a more stable feeding area. Smaller dowels, by contrast, allow for greater movement, creating less stability. Additionally, while a longer box can hold more syrup, it may become cumbersome to transport to the feeding site. Higher walls on the box enable it to hold more syrup. The longer walls of the container provide structural integrity and support, ensuring that the container maintains its shape when filled with feed minimizing the risk of spills during transportation. The longer walls of the container enhance structural integrity and support, ensuring that the container retains its shape when filled with feed and reducing the risk of spills during transportation.

It is also crucial to maintain consistent spacing so that the floating dowels are kept at a bee body width apart from the walls. If the walls flare out at the top when filled with bee syrup, this would result in gaps wider than a bee body width between the ends of the floating dowels and the container walls.

The dowels don't all need to be the same diameter; however, if they vary in size, they should be evenly distributed across the surface area. This balanced arrangement will help create a more stable floating surface for the bees. Additionally, in the event of rain or intense sun, an umbrella can be used to provide protection over the feeding area, ensuring that the bees can continue to feed undisturbed and the syrup remains uncontaminated.

The placement of the feeders is also important. It is advisable to position them behind a fence, out of sight from neighbors, to avoid causing any unnecessary concern. This discreet placement ensures that the bees can feed peacefully while maintaining good relations with the surrounding community.

Preferred Floating Dowel Enclosed Hive Attachment Bee Feeder Embodiment of the Invention Embodiment for a Floating Dowel Enclosed Hive Attachment with Snap-On Lid: The patent includes a design for a floating dowel enclosed hive attachment, featuring a snap-on lid. This lid is engineered to securely cover the container's top, safeguarding the feed from contaminants and preventing spillage. It can be easily removed or reattached, providing quick access for cleaning or inspection. Sliding Refill Door (6): Integrated into the snap-on lid, the sliding refill door allows beekeepers to refill the feeder effortlessly by sliding the door open, adding feed, and then closing it. This design avoids the need to completely remove the lid, thereby reducing the risk of disturbing the bees.

Spacer (9): The spacer is a crucial component that maintains the appropriate distance between the feeder and the beehive. It positions the feeder in front of the hive opening, ensuring there is enough space for bees to enter the feeder without obstruction. This arrangement also helps prevent access to the feeder by other bees or insects.

Opening Between the Feeder and Hive (10): The space between the feeder and the hive serves as a passageway for bees to access the feeder. It is dimensioned to facilitate easy entry for bees while protecting the feed from external elements and pests.

Surface Area Within the Enclosed Bee Hive Feeder Attachment: The surface area, defined by the arrangement of the wooden dowels, provides a stable and accessible platform for bees to land and feed. This design ensures that bees can easily access and consume the feed without difficulty.

Alignment Tabs (11): Designed to aid in the correct positioning of the feeder at the front of the bee hive, the alignment tabs help ensure that the feeder matches the hive's dimensions. This alignment secures the feeder in place and prevents any misalignment that could impede bee access.

Detailed Description of Materials

Container Walls and Dowels: The feeder's walls and dowels are primarily constructed from high-grade, durable polyethylene, known for its resistance to environmental degradation and chemical stability, which is crucial for maintaining the integrity of the bee syrup. The wooden dowels are treated with a food-safe, anti-fungal sealant to prevent decay and mold buildup, extending their usability and safety in bee feeding applications.

Mechanical Details

Sliding Refill Door and Locking Mechanism

The sliding refill door is crafted from reinforced polycarbonate, offering transparency for easy monitoring of syrup levels. The door integrates a stainless-steel slide-lock mechanism, designed to withstand repetitive use and environmental wear. This lock includes a fail-safe catch that prevents accidental openings, securing the door against vibrations or when handled during maintenance.

Adjustable Spacer

The spacer utilizes a telescopic design made from aluminum, allowing it to expand or contract to fit various hive sizes. This adjustment is facilitated by a simple twist-lock mechanism that securely holds the spacer at the desired length, ensuring the feeder remains at an optimal distance from the hive entrance to minimize bee traffic congestion.

Operational Workflow

Refilling Process

Refilling the feeder involves sliding the refill door open using an ergonomically designed handle that minimizes disturbance to the bees. The door slides smoothly on a set of precision-engineered rails that ensure a quiet and gentle operation to prevent startling the bees.

Integration with Hive Setups

The feeder is designed to attach seamlessly to existing hive structures using universal mounting brackets. These brackets are adjustable and include soft silicone pads to avoid damaging the hive. The alignment tabs are marked with visible indicators for correct positioning, ensuring that the feeder aligns perfectly with the hive entrance every time.

Environmental Considerations

All plastic components of the feeder are manufactured from recycled polyethylene terephthalate (PET), reducing the carbon footprint of production. This material choice not only supports sustainability but also ensures that the feeder remains lightweight and resistant to UV degradation.

Safety Features

Non-Slip Surface and Edge Design

The top surface of the dowels features a non-slip texture, achieved by micro-etching the sealant to create a grip-friendly finish. The edges of the container are rounded and coated with a soft-touch material to prevent injuries to both bees and beekeepers during interaction with the feeder.

Maintenance and Durability

The feeder is designed for easy maintenance, requiring only periodic cleaning with mild soap and water. The components can be quickly disassembled without tools, thanks to snap-fit connections that simplify the process of taking apart and reassembling the unit.

Expected to last for at least 10 years under normal conditions, the feeder's materials and construction methods were chosen for their longevity and resistance to typical stresses encountered in outdoor environments.

Quantifiable Improvements

Field tests indicate that the feeder reduces the need for refills by 40% compared to traditional designs, thanks to its larger capacity and efficient syrup consumption rates. This improvement not only saves time but also decreases the stress placed on bee colonies during maintenance activities.

Benefits of the Invention

Prevents Bee Drowning: The floating dowels create a safe surface for bees to land on, significantly reducing the risk of bees drowning in the syrup. In the various embodiments described herein, there have been no instances of bee drownings or deaths due to fighting in the first six months of use.

Reduces Inter-Hive Fighting: The extended feeding surface area allows bees to spread out while feeding, minimizing aggressive behavior and reducing inter-hive conflicts. By providing ample space and multiple feeding points, the feeder reduces competition among bees, which significantly lowers instances of inter-hive fighting. The design of the floating dowels ensures that bees have safe landing spots, drastically reducing the risk of drowning by preventing bees from falling into the syrup. In the rectangular embodiment, there is reduced contention among bees as the feeding distances are spaced further apart.

Efficient Feeding: The larger container design allows for the feeding of more bees at once, reducing the need for multiple feeders and saving time on refills.

Osmotic Preservation of Dowels: The high-sugar concentration in the syrup creates an osmotic effect that preserves and protects the wooden dowels from decay, extending the life of the feeder.

Optimized Surface Area: The design provides more surface area for bees to feed compared to traditional bucket-style feeders, making it more efficient for large colonies.

Safe and Comfortable Feeding: The floating dowels are light enough for bees to walk on and spin, ensuring they can comfortably and efficiently collect syrup.

Less Time-Consuming Maintenance: The larger capacity reduces the frequency of refilling, making it more convenient for beekeepers.

Prevents Overcrowding: The long, rectangular design helps prevent overcrowding at the feeding area, leading to a calmer and more productive feeding environment.

Versatile Length: The container can be designed in various lengths while maintaining its functional advantages, allowing customization based on the needs of different beekeepers.

Cost-Effective: Reduces the need to purchase multiple small feeders, as one large feeder can service a large number of bees.

Much Faster Nutrient Consumption: The large surface area allows bees to consume the syrup up to 100 times quicker compared to traditional feeders. It is absolutely amazing to watch.

Bee Feeder Can Be Refilled Even While Bees Are Actively Feeding: Another advantage is that the bee feeder can be refilled even while bees are actively feeding. By slowly pouring the syrup into a specific spot on the floating surface, the liquid seamlessly flows between a few of the dowels without disrupting the others, allowing the bees to continue feeding undisturbed.

Provides A Visual Representation of The Hive's Population: Another benefit is the psychological impact of witnessing the sheer number of bees actively feeding on the larger surface area. The sight of so many bees and the collective hum they create is truly mesmerizing. Additionally, this setup provides a visual representation of the hive's population using the feeder, offering insights that might otherwise go unnoticed.

BRIEF DESCRIPTION OF THE DRAWING FIGURES

LISTING OF THE REFERENCE NUMBERS IN THE DRAWINGS

Container (1): The feeder comprises a long rectangular container made from durable material. The container can vary in length but is optimally between 2 to 6 feet long. The height of the walls ranges from 4 to 8 inches to contain a significant volume of bee syrup (5). The width of the container is approximately 4 to 6 inches.

Longer Walls (2): The longer walls of the container provide structural integrity and maintain the syrup's containment.

Shorter Walls (3): The shorter walls connect the longer walls and help contain the syrup.

Wooden Dowels (4): Wooden dowels are placed side by side within the container, floating on the surface of the syrup. Each dowel is approximately ¼ inch in diameter and slightly shorter than the container's width, allowing them to move slightly when bees land on them.

Bee Syrup (5): The container holds a bee syrup mixture with a high concentration of sugar, which not only feeds the bees but also creates an osmotic preservation effect (9) on the wooden dowels, protecting them from decay.

Sliding Refill Door (6): Integrated into the snap-on lid (L), the sliding refill door allows beekeepers to refill the feeder effortlessly by sliding the door open, adding feed, and then closing it.

Bee Landing Surface (7): The floating dowels create a stable surface for bees to land and feed. The close arrangement of the dowels ensures that bees do not fall into the syrup.

Bee Entry Points (8): Bees can enter and exit the feeder from any direction along the container's open top.

Spacer (9): The spacer is a crucial component that maintains the appropriate distance between the feeder and the beehive. It positions the feeder in front of the hive opening, ensuring there is enough space for bees to enter the feeder without obstruction.

Opening Between the Feeder and Hive (10): The space between the feeder and the hive serves as a passageway for bees to access the feeder. It is dimensioned to facilitate easy entry for bees while protecting the feed from external elements and pests.

Alignment Tabs (11): Designed to aid in the correct positioning of the feeder at the front of the bee hive, the alignment tabs help ensure that the feeder matches the hive's dimensions. This alignment secures the feeder in place and prevents any misalignment that could impede bee access.

DETAILED DESCRIPTION OF THE EMBODIMENTS

Figure 1:
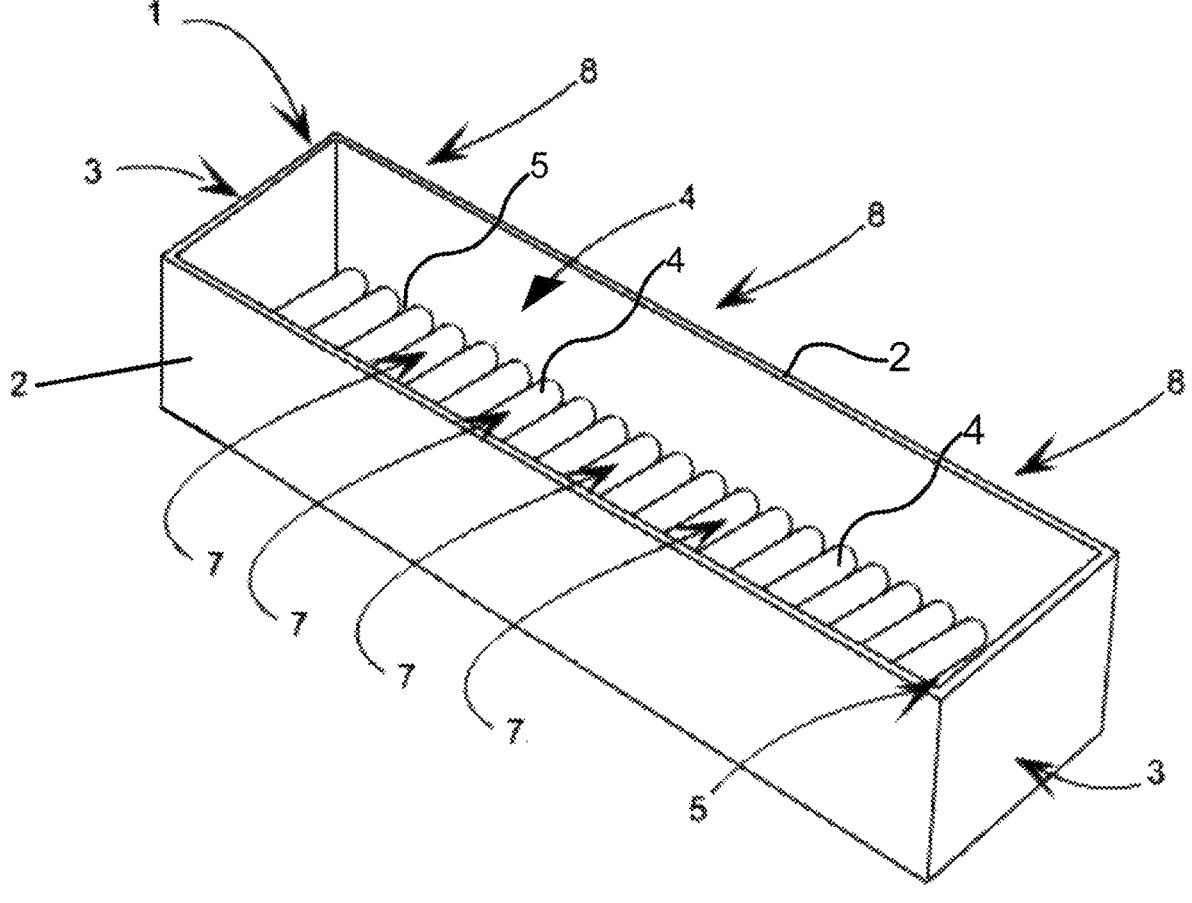
FIG. 1 is a perspective view of an embodiment of a fee feeder according to the present invention that includes a number of parallelly disposed cylindrical dowels in a container.

FIG. 1 is an perspective view drawing of the bee feeder, encompassing all key features and components including: a rectangular container (1) depicted as a long rectangular box. Container (1) is designed to hold the bee syrup and has dimensions ranging from 2 to 6 feet in length, 4 to 6 inches in width, and 4 to 8 inches in height; longer walls (2) sides of the container, which provide the main structural support and contain the bee syrup within the feeder; shorter walls (3): along sides of the container, connecting the longer walls and completing the rectangular structure; a series of wooden dowels (4) floating on the surface of bee syrup within the container. Each dowel is approximately ¼ inch to 1 inch in diameter and slightly shorter than the width of the container. The dowels are arranged side by side, providing a stable landing and feeding surface for the bees; a quantity of bee syrup (5), liquid food for the bees, contained within the rectangular container with a high sugar concentration which contributes to the osmotic preservation effect on the dowels; a bee landing surface (7) formed by the floating dowels, which allows bees to safely land and feed without the risk of drowning; and bee entry points (8) at open top of the container, providing access for bees to enter and exit the feeder freely.

Figure 2:
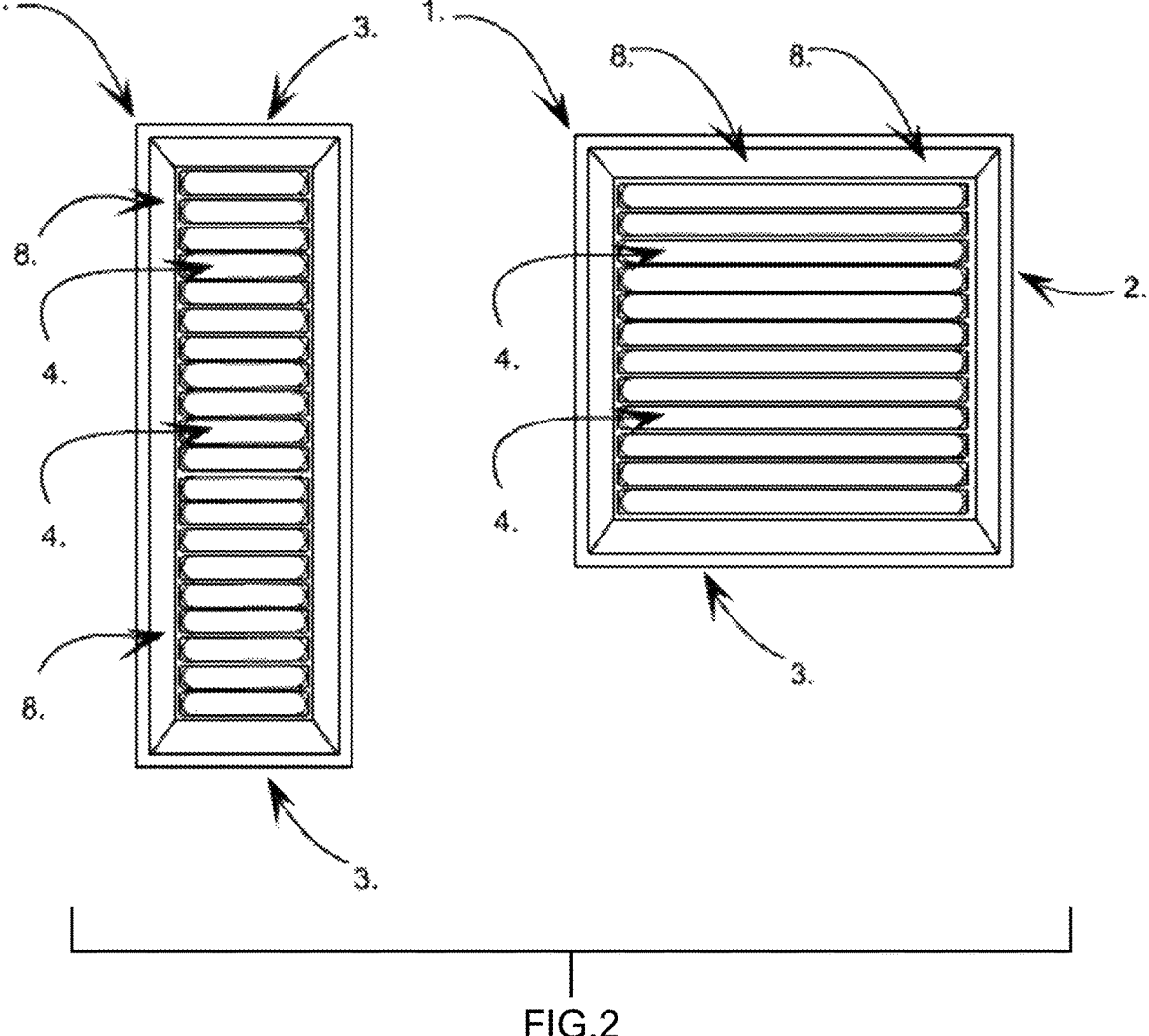
FIG. 2 shows two bee feeders of different dimensions with parallelly disposed cylindrical dowels.

FIG. 2 is a top plan view drawing of both a rectangular and square bee feeder, encompassing all key features and components including a rectangular container (1) which is the primary structure of the bee feeder, depicted as a long rectangular box. The container is designed to hold the bee syrup and has dimensions ranging from 2 to 6 feet in length, 4 to 6 inches in width, and 4 to 8 inches in height; longer walls (2) which provide the main structural support and contain the bee syrup within the feeder; shorter walls (3) at ends of the container, connect the longer walls and complete the rectangular structure; a series of wooden dowels (4) floating on the surface of the bee syrup within the container. Each dowel is approximately ¼ inch to 1 inch in diameter and slightly shorter than the width of the container. The dowels are arranged side by side, providing a stable landing and feeding surface for the bees; bee syrup (5) provides liquid food for the bees, and is contained within the rectangular container. The syrup has a high sugar concentration, which contributes to the osmotic preservation effect on the dowels; a bee landing surface (7) formed by the floating dowels, which allows bees to safely land and feed without the risk of drowning and bee entry points (8) at the open top of the container, providing access for bees to enter and exit the feeder freely.

Figure 3:
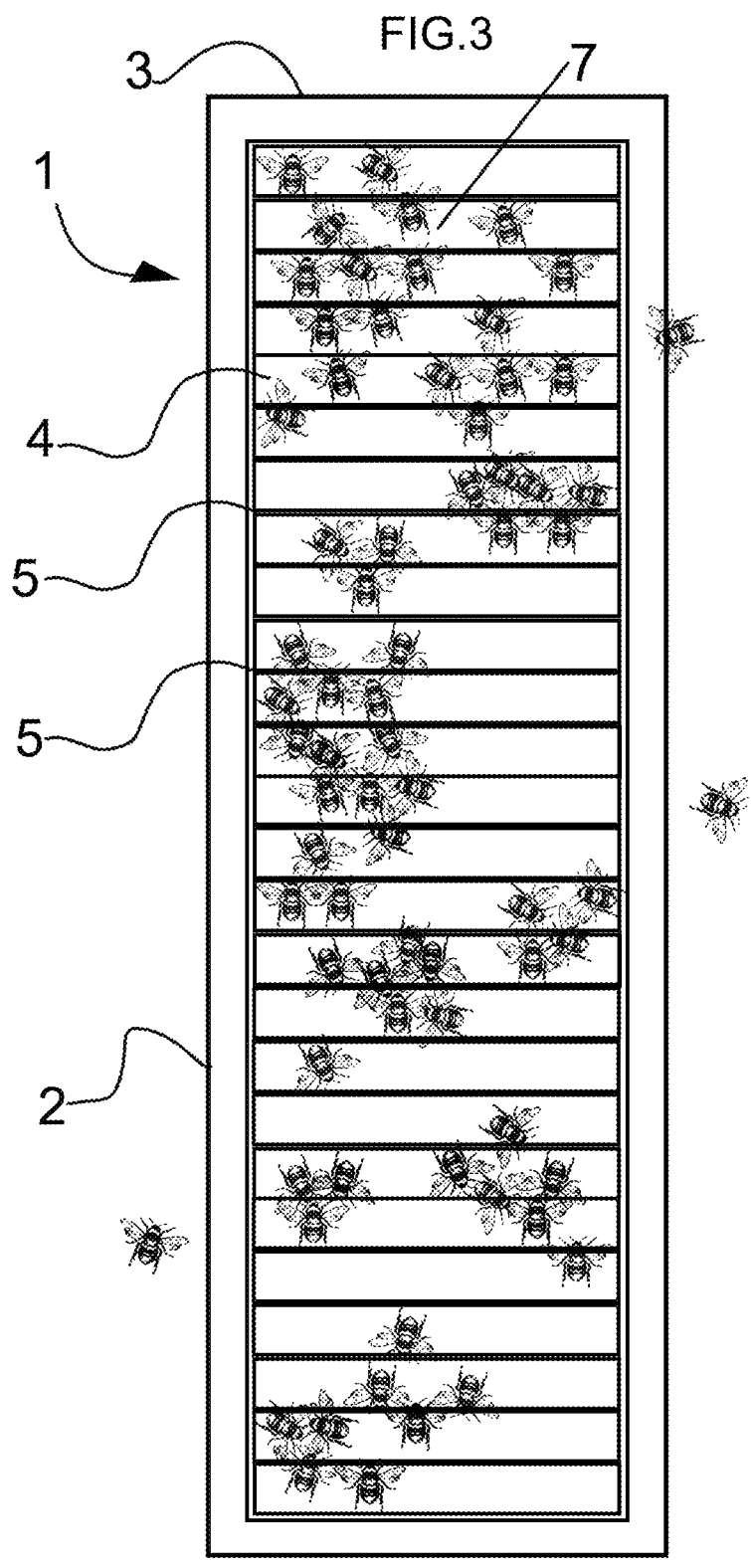
FIG. 3 shows a great number of bees feeding from the bee feeder.

FIG. 3 is a top view of a bee feeder in typical use setting encompassing all key features and components including a rectangular container (1) which in the embodiment shown is a long rectangular box. The container is designed to hold the bee syrup and has dimensions ranging from 2 to 6 feet in length, 4 to 6 inches in width, and 4 to 8 inches in height. Like previous examples, the container includes both longer and shorter walls that surround the bee syrup and the floating cylindrical dowels. The wooden dowels are placed in series and parallelly as shown, and each dowel is approximately ¼ inch to 1 inch in diameter and slightly shorter than the width of the container. The dowels are arranged side by side, providing a stable landing and feeding surface for the bees. A quantity of bee syrup, the liquid food for the bees, is contained within the rectangular container. The syrup has a high sugar concentration, which contributes to the osmotic preservation effect on the dowels.

The floating dowels for a bee landing surface which allows bees to safely land and feed without the risk of drowning. The open top of the container, provides access for bees to enter and exit the feeder freely.

Figure 4:
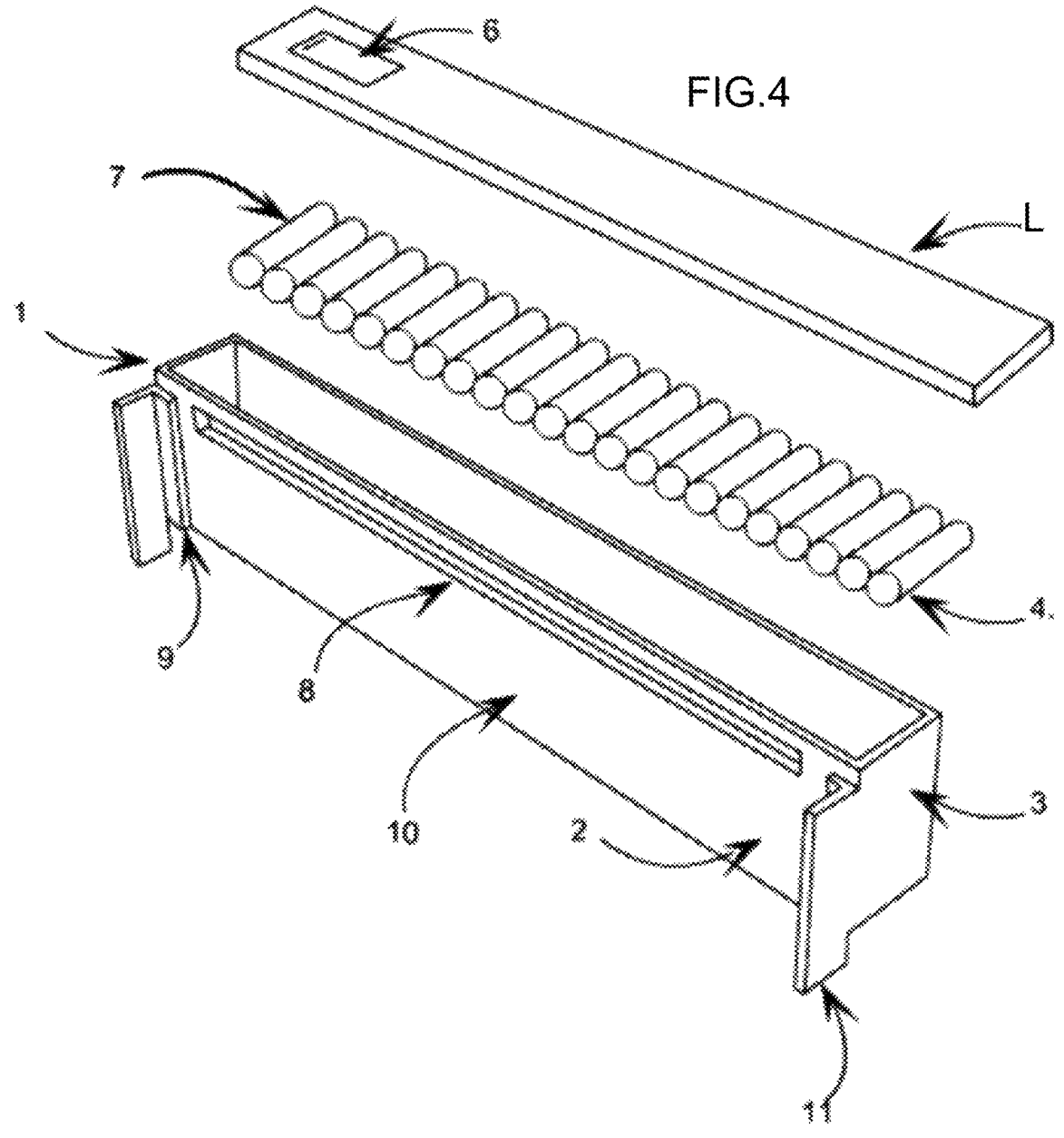
FIG. 4 is an exploded view of another embodiment of a bee feeder according to the present invention.

FIG. 4 is an illustrative drawing of another embodiment of an enclosed floating dowel bee feeder hive attachment that similar to previous examples includes a rectangular container adapted to contain a quantity of bee syrup, that forms a medium for the floating of a series of dowels arranged parallelly. Each dowel is approximately ¼ inch to 1 inch in diameter and slightly shorter than the width of the container. The dowels are arranged side by side, providing a stable landing and feeding surface for the bees. The bee syrup has a high sugar concentration, which contributes to the osmotic preservation effect on the dowels.

Also shown is a sliding refill door (6) integrated into a snap-on lid (L). The sliding refill door allows beekeepers to refill the feeder effortlessly by sliding the door open, adding feed, and then closing it. Like the other examples described and shown, a bee landing surface (7) is formed by the floating dowels, which allows bees to feed without the risk of drowning. Bee entry points (8) provide access for bees to enter and exit the enclosed floating dowel bee feeder freely. A spacer (9) maintains the appropriate distance between the feeder and the beehive. It positions the feeder in front of the hive opening, ensuring there is enough space for bees to enter the feeder without obstruction. An opening (10) between the feeder and hive serves as a passageway for bees to access the feeder. It is dimensioned to facilitate easy entry for bees while protecting the feed from external elements and pests. Alignment tabs (11) are adapted to aid in the correct positioning of the feeder at the front of the bee hive, the alignment tabs help ensure that the feeder matches the hive's dimensions. This alignment secures the feeder in place and prevents any misalignment that could impede bee access.

The invention claimed is:

1. A bee feeder, comprising:
   a rectangular or square container with vertical interior sides;
   a plurality of cylindrical wooden dowels, each dowel with a longitudinal curved surface (4);
   each of the cylindrical wooden dowels of the plurality of wooden dowels are arranged parallelly side by side, with their longitudinal curved surfaces directly adjacent one another and the dowels when floating on bee syrup (5) in the container are capable of coaxial rotation induced by bee movement on the dowels.

2. The bee feeder, of claim 1 wherein the rectangular container (1) includes relatively longer walls (2) and relatively shorter walls (3) that form the structure of the rectangular container; and,
   each of the wooden dowels of plurality of dowels (4), are a honey bee body length shorter than a width of the container, when arranged side by side and floating on the bee syrup (5) within the container.

3. The bee feeder, of claim 2 wherein the rectangular container (1) includes a length of 2 to 6 feet, the width of the container is 4 to 6 inches, and a height of the container is 4 to 8 inches and wherein each wooden dowel of the plurality of wooden dowels (4), is approximately ¼ inch to 1 inch in diameter and slightly shorter than the width of the container, and the wooden dowels are arranged side by side and floating on the bee syrup (5) within the container.

4. The bee feeder of claim 1, wherein each of the wooden dowels of the plurality of dowels (4) are configured to float on the bee syrup and allow slight movement when bees land on them, providing a stable landing surface (7) such that the bees are prevented from slipping beneath the dowels when landing thereon to ensure bee safety and accessibility to the bee syrup (5).

5. The bee feeder of claim 2, wherein the relatively longer walls of the container (1) m-ay include various lengths, up to and exceeding 6 feet, while maintaining the functional advantages of preventing bee drowning and reducing inter-hive fighting.

6. The bee feeder of claim 1, wherein the bee syrup (5) has a sugar concentration sufficient to create an osmotic preservation effect (6) such that the wooden dowels (4) are protected from decay.

7. The bee feeder of claim 1, wherein the dowels (4) are made from a material that is resistant to warping and degradation when in constant contact with sugar syrup.

8. The bee feeder of claim 1, wherein the container (1) includes a removable or adjustable divider (11) within the container, allowing the feeder to be adapted for different colony sizes or to segregate different types of bees.

9. The bee feeder of claim 1, wherein the container (1) is equipped with a sloped bottom surface designed to direct any remaining syrup toward one end of the feeder for easier cleaning and refilling.

10. The bee feeder of claim 1, wherein the dowels (4) have varying diameters mixed and distributed evenly across the surface to provide a more stable floating platform and to accommodate bees of different sizes.

11. The bee feeder of claim 1, wherein the container (1) is constructed with a transparent or semi-transparent material allowing beekeepers to easily monitor the syrup level and the feeding activity without disturbing the bees.

12. The bee feeder of claim 1, designed with modular connectors on the sides, enabling multiple bee feeders to be linked together to create a larger continuous feeding surface.

13. The enclosed bee feeder of claim 1 adapted for attachment to a beehive box comprising:
   the rectangular or square container configured with a snap-on lid designed to securely cover a top of the container to protect the bee syrup from contaminants and prevent spillage, wherein the snap-on lid is removable for access to an interior of the container for cleaning or inspection;
   a sliding refill door integrated into the snap-on lid, enabling beekeepers to refill the feeder by sliding the door open to add the bee syrup and then close it, thereby maintaining the integrity of the enclosure without the need to remove the entire snap-on lid;
   a spacer attached to the base of the container, structured to maintain a predefined distance between the feeder and the beehive box, which enables the feeder to be positioned such that it aligns with the beehive box opening and allows sufficient space for bees to enter the feeder without obstruction, while also serving as a barrier to other insects;
an opening between the feeder and the beehive box sized and shaped to facilitate easy-and-safe-passage for bees, thereby allowing them access to the feed while minimizing exposure to external elements and pests;
   a landing surface within the feeder, formed by the plurality of cylindrical floating wooden dowels arranged to create a stable and accessible platform that supports bee landing and feeding activities, and wherein the dowels are disposed transversely in the container and sized such that they can rotate along a longitudinal axis atop the bee syrup, yet with a small clearance gap with a width between the dowels and sides of the container, the gap width sized to prevent bees from trapping themselves between the vertical container sides and ends of the dowels,
   alignment tabs located on an exterior of the container, adapted to interface with corresponding features on the bee hive box, ensuring that the feeder is correctly positioned and secured against the bee hive box, preventing misalignment that could hinder bee access and feeder functionality.

14. The bee feeder of claim 13, wherein the sliding refill door is equipped with a mechanical locking mechanism that secures the refill door in both opened and closed positions, facilitating the addition of bee syrup without necessitating the removal of the entire lid.

15. The bee feeder of claim 13, wherein the sliding refill door includes a slide-lock mechanism that engages with a catch on the lid to prevent unintended opening.

16. The bee feeder of claim 13, wherein the spacer comprises adjustable mechanical sliders that extend or retract to set the distance between the feeder and the beehive from two to six inches, accommodating various bee hive box designs.

17. The bee feeder of claim 13, wherein the opening between the feeder and hive includes a mesh gate that permits bees to pass while blocking larger insects, the mesh gate constructed from a durable polymer material.

18. The bee feeder of claim 13, wherein the alignment tabs feature graduated markings to visually indicate alignment with the bee hive box entrance, with each tab locking into corresponding slots on the bee hive box to secure the feeder's position.

19. The bee feeder of claim 13, wherein the surface area within the enclosed bee hive feeder is coated with a polyurethane non-slip finish to enhance traction for bees during feeding.

20. The bee feeder of claim 13, wherein each dowel of the plurality of dowels is surface-treated with a textured pattern of concentric rings.

21. The bee feeder of claim 13, wherein the feeder incorporates an electronically controlled heating element that maintains the bee syrup at a constant temperature of 35° C. (95° F.), regulated by an integrated thermostat.

22. The bee feeder of claim 13, wherein the container is fitted with electronic level sensors that monitor syrup volume and a Wi-Fi module to transmit data to a beekeeper's device.

23. The bee feeder of claim 13, wherein the feeder includes interlocking tabs and slots allowing for complete disassembly for cleaning, each component made from stainless steel to prevent corrosion.

24. The bee feeder of claim 13, wherein components thereof are manufactured from recycled polyethylene terephthalate (PET), certified by the Environmental Protection Agency (EPA) for environmental sustainability.

\* \* \* \* \*